F. J. MARTIN.
Saw-Burring Tool.

No. 159,593

Patented Feb. 9, 1875.

WITNESSES:

INVENTOR:
F. J. Martin
BY
ATTORNEYS.

UNITED STATES PATENT OFFICE.

FRANKLIN J. MARTIN, OF WILLIAMSPORT, PENNSYLVANIA.

IMPROVEMENT IN SAW-BURRING TOOLS.

Specification forming part of Letters Patent No. 159,593, dated February 9, 1875; application filed December 12, 1874.

*To all whom it may concern:*

Be it known that I, FRANKLIN J. MARTIN, of Williamsport, Lycoming county, Pennsylvania, have invented a new and Improved Saw-Burring Machine, of which the following is a specification:

My invention consists of two angle-plates about the length of four or five saw-teeth, bolted together adjustably, so that a channel is obtained between the plates for the reception of the edge of the saw between them, the channel being widened or narrowed, according to the gage of the saw to be burred, by shifting one of the plates on the other.

This tool I place on the edge of the saw, with the bottom wall of the channel against the points of the teeth, after the saw has been filed, and gently tap it with a hammer, and thereby burr the points of the teeth a little, flattening them slightly on the points, and making them of uniform width and length.

By this burring of the teeth the saw is prevented from dodging out of its course, and it makes the lumber much smoother than the teeth are capable of as ordinarily dressed.

Figure 1:
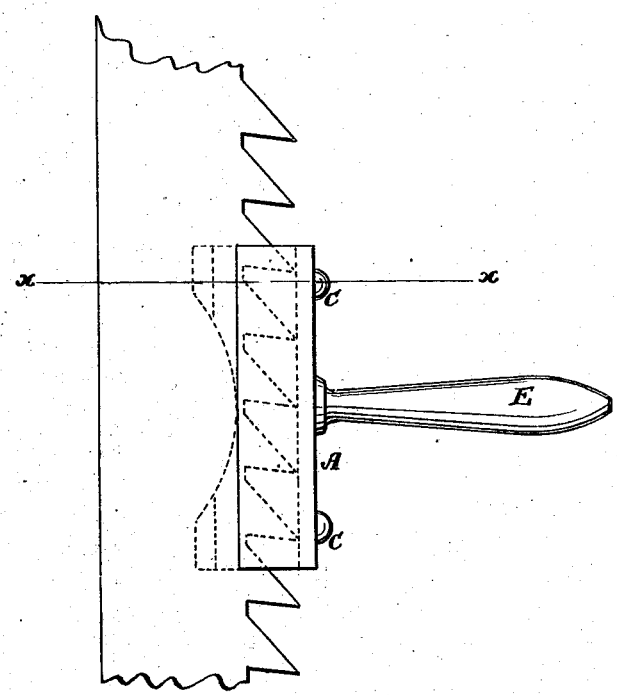
Figure 2:
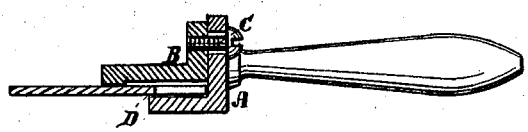

Figure 1 is a side elevation of my improved burring-gage, and a saw to which the gage is applied. Fig. 2 is a transverse section of Fig. 1, taken on the line $x$ $x$.

Similar letters of reference indicate corresponding parts.

A and B represent the two angle-plates forming the gage. They are bolted together by one wing, as seen at C, so as to make a channel, D, between the other wings, adapted to receive the edge of the saw between them, the said channel being adjustable to any gage by shifting one plate on the other, for which the fastening is suitably arranged. E is a handle, attached to one of the plates for convenience in holding the tool to its work.

This tool is placed on the edge of the saw, against the points of the teeth, and gently tapped with a hammer, to produce burrs on the points after they have been filed sharp, beginning at the top of the saw, and moving downward as the work progresses.

Having thus described my invention, I claim as new, and desire to secure by Letters Patent—

The improved saw-burring tool, consisting of two angle-plates, A B, bolted together adjustably, and arranged and adapted for burring saw-teeth, substantially as specified.

FRANKLIN J. MARTIN.

Witnesses:
 PHILIP A. MOLTZ,
 GEO. W. QUINN.